US009571962B2

United States Patent
Skibiski et al.

(10) Patent No.: US 9,571,962 B2
(45) Date of Patent: *Feb. 14, 2017

(54) SYSTEM AND METHOD OF PERFORMING LOCATION ANALYTICS

(71) Applicant: Yellowpages.com LLC, Glendale, CA (US)

(72) Inventors: Greg Skibiski, New York, NY (US); Alex Sandy Pentland, Lexington, MA (US); Tony Jabara, New York, NY (US); Christine Lemke, New York, NY (US); Markus Loecher, Princeton Junction, NJ (US); Girish Rao, New York, NY (US); Jason Uechi, Montclair, NJ (US); Blake Shaw, New York, NY (US); Joseph Mattiello, New York, NY (US)

(73) Assignee: Yellowpages.com LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,942

(22) Filed: Jan. 13, 2015

(65) Prior Publication Data

US 2015/0304807 A1 Oct. 22, 2015

Related U.S. Application Data

(63) Continuation of application No. 13/304,111, filed on Nov. 23, 2011, now Pat. No. 8,959,098, which is a (Continued)

(51) Int. Cl.
*G06Q 30/00* (2012.01)
*G06F 17/30* (2006.01)
(Continued)

(52) U.S. Cl.
CPC ............ *H04W 4/02* (2013.01); *G01C 21/3476* (2013.01); *G01C 21/3641* (2013.01);
(Continued)

(58) Field of Classification Search
CPC   G06Q 30/02; G06Q 30/0254; G06Q 30/0259; G06Q 30/0261; G06Q 30/0269; G06Q 30/0281; G06F 17/30867; H04W 4/028; H04W 4/02
See application file for complete search history.

(56) References Cited

U.S. PATENT DOCUMENTS 6,038,559 A    3/2000  Ashby et al.
6,129,274 A    10/2000 Suzuki
(Continued)

FOREIGN PATENT DOCUMENTS

EP    2518680      4/2012
WO    99/04350     1/1999
(Continued)

OTHER PUBLICATIONS

Donoho, David, et al., "Higher Criticism for Detecting Sparse Heterogeneous Mixtures," The Annals of Statistics, 32(3):962-994 (2004).
(Continued)

*Primary Examiner* — Srirama Channavajjala
(74) *Attorney, Agent, or Firm* — Alston & Bird LLP (57) ABSTRACT

A system and method are provided for associating location data from one or more unique sources. The place and time of a unique location enabled device are associated with stored demographic information relating to the particular place and particular time. The place and time of the unique location enabled device are associated with a historical record of past locations and time of locations that the device has been. Based on the association of demographical infor-
(Continued)

mation and historical information, the unique location enable device is assigned to one or more groups or tribes. The location of all members of the group or tribe can be aggregated and exported for further analysis or display, thereby showing all group or tribe members at a particular time and place.

23 Claims, 9 Drawing Sheets

Related U.S. Application Data continuation of application No. 12/134,634, filed on Jun. 6, 2008, now abandoned.

(51) Int. Cl.
| | |
|---|---|
| H04W 4/02 | (2009.01) |
| H04M 11/04 | (2006.01) |
| G06F 15/16 | (2006.01) |
| G06F 3/00 | (2006.01) |
| G01C 21/36 | (2006.01) |
| H04N 21/45 | (2011.01) |
| H04M 1/725 | (2006.01) |
| G01C 21/34 | (2006.01) |
| G08G 1/0969 | (2006.01) |
| G06Q 30/02 | (2012.01) |
| G06Q 30/06 | (2012.01) |
| G06Q 50/00 | (2012.01) |

(52) U.S. Cl.
CPC ..... *G01C 21/3679* (2013.01); *G01C 21/3682* (2013.01); *G06F 3/00* (2013.01); *G06F 15/16* (2013.01); *G06F 17/30* (2013.01); *G06F 17/3087* (2013.01); *G06Q 30/02* (2013.01); *G06Q 30/0241* (2013.01); *G06Q 30/0261* (2013.01); *G06Q 30/0631* (2013.01); *G06Q 50/01* (2013.01); *G08G 1/0969* (2013.01); *H04M 1/72572* (2013.01); *H04M 11/04* (2013.01); *H04N 21/4524* (2013.01)

(56) References Cited

U.S. PATENT DOCUMENTS

| | | | |
|---|---|---|---|
| 6,408,278 B1 | 6/2002 | Carney et al. | |
| 6,704,787 B1 | 3/2004 | Umbreit | |
| 6,968,333 B2 | 11/2005 | Abbott et al. | |
| 7,107,285 B2 | 9/2006 | von Kaenel et al. | |
| 7,292,963 B2 | 11/2007 | Bornhoevd et al. | |
| 7,720,723 B2* | 5/2010 | Dicker | G06Q 30/02 |
| | | | 705/14.51 |
| 8,224,766 B2 | 7/2012 | Skibiski et al. | |
| 8,775,960 B1 | 7/2014 | Flores | |
| 8,825,759 B1* | 9/2014 | Jackson | H04L 67/02 |
| | | | 705/14.69 |
| 2001/0011226 A1 | 8/2001 | Greer et al. | |
| 2001/0029506 A1 | 10/2001 | Lee et al. | |
| 2001/0036224 A1 | 11/2001 | Demello et al. | |
| 2001/0049636 A1 | 12/2001 | Hudda et al. | |
| 2002/0111852 A1 | 8/2002 | Levine | |
| 2002/0111994 A1 | 8/2002 | Raghunandan | |
| 2002/0174428 A1* | 11/2002 | Agnihotri | H04N 7/163 |
| | | | 725/46 |
| 2003/0040850 A1* | 2/2003 | Najmi | G06F 3/0482 |
| | | | 701/1 |
| 2003/0064350 A1 | 4/2003 | Rubinstenn et al. | |
| 2003/0101024 A1 | 5/2003 | Adar et al. | |
| 2003/0109266 A1 | 6/2003 | Rafiah et al. | |
| 2003/0135494 A1 | 7/2003 | Phelan et al. | |
| 2004/0023666 A1* | 2/2004 | Moon | G06F 17/3087 |
| | | | 455/456.1 |
| 2004/0044549 A1 | 3/2004 | Loop | |
| 2004/0117358 A1 | 6/2004 | von Kaenel et al. | |
| 2004/0162830 A1* | 8/2004 | Shirwadkar | G06F 17/3087 |
| 2004/0201500 A1* | 10/2004 | Miller | G06Q 30/0255 |
| | | | 340/995.1 |
| 2004/0249930 A1 | 12/2004 | Mousavi et al. | |
| 2005/0032528 A1 | 2/2005 | Dowling et al. | |
| 2005/0143909 A1 | 6/2005 | Orwant | |
| 2005/0177614 A1 | 8/2005 | Bourne | |
| 2005/0203807 A1* | 9/2005 | Bezos | G06F 17/30867 |
| | | | 705/14.53 |
| 2005/0246222 A1 | 11/2005 | Bailey | |
| 2006/0074883 A1 | 4/2006 | Teevan et al. | |
| 2006/0085177 A1 | 4/2006 | Toyama | |
| 2006/0173613 A1* | 8/2006 | Iwahori | G01C 21/32 |
| | | | 701/450 |
| 2006/0195361 A1* | 8/2006 | Rosenberg | G06Q 30/02 |
| | | | 705/14.52 |
| 2006/0223505 A1 | 10/2006 | Starr et al. | |
| 2006/0266830 A1* | 11/2006 | Horozov | G07C 13/00 |
| | | | 235/386 |
| 2006/0270421 A1 | 11/2006 | Phillips et al. | |
| 2006/0271618 A1* | 11/2006 | Kokubo | H04M 1/72586 |
| | | | 709/202 |
| 2007/0005419 A1* | 1/2007 | Horvitz | G06Q 30/0241 |
| | | | 701/533 |
| 2007/0072591 A1* | 3/2007 | McGary | H04W 4/02 |
| | | | 455/414.1 |
| 2007/0156435 A1* | 7/2007 | Greening | G06Q 30/00 |
| | | | 705/1.1 |
| 2007/0262860 A1 | 11/2007 | Salinas et al. | |
| 2007/0281690 A1* | 12/2007 | Altman | H04W 4/185 |
| | | | 455/435.1 |
| 2007/0293958 A1* | 12/2007 | Stehle | G06Q 10/04 |
| | | | 700/30 |
| 2008/0005674 A1 | 1/2008 | Wattenberg et al. | |
| 2008/0070593 A1* | 3/2008 | Altman | H04L 63/102 |
| | | | 455/457 |
| 2008/0082472 A1 | 4/2008 | Dalton | |
| 2008/0104225 A1 | 5/2008 | Zhang et al. | |
| 2008/0140650 A1 | 6/2008 | Stackpole | |
| 2008/0154696 A1 | 6/2008 | Spiegelman et al. | |
| 2008/0188261 A1 | 8/2008 | Arnone | |
| 2009/0319329 A1 | 12/2009 | Aggarwal et al. | |
| 2010/0169340 A1* | 7/2010 | Kenedy | G06Q 30/0631 |
| | | | 707/758 |
| 2015/0304807 A1* | 10/2015 | Skibiski | G06Q 30/02 |
| | | | 455/456.3 |

FOREIGN PATENT DOCUMENTS

| | | |
|---|---|---|
| WO | 01/80133 | 10/2001 |
| WO | 0233626 | 4/2002 |
| WO | WO 2010/126973 | * 11/2010 |

OTHER PUBLICATIONS

Kulldorff, Martin, "A Spatial Scan Statistic," Communications in Statistics—Theory and Methods, 26(6): 1481-1496 (1997).
Kulldorff, Martin, "Prospective time-periodic geographical disease surveillance using a scan statistic," Journal of the Royal Statistical Society, A164:61-72 (2001).
Kulldorff, Martin, "Spatial Disease Clusters: Detection and Inference," Statistics in Medicine 4:799-810 (1995).
Loh, Ji Meng, et al., "Accounting for Spatial Correlation in the Scan Statistic," manuscript, also published in Annals of Applied. Statistics 1(2): 560-584 (2007).
Neill, Daniel B., "Detection of Spatial and Spatio-Temporal Clusters," (Ph.D. thesis, Carnegie Mellon University) (2006).
Rogerson, Peter A., "Monitoring Point Patterns for the Development of Space-Time Clusters," Journal of the Royal Statistical Society. Series A (Statistics in Society), 164(1):87-96 (2001).
International Search Report mailed in PCT/US2009/058782 on Apr. 26, 2010.
International Search Report mailed in PCT/US2009/058768 on May 17, 2010.

(56) References Cited

OTHER PUBLICATIONS

Neill et al., "Anomalous Spatial Cluster Detection", "Proceedings of the KDD 2005 Workshop on Data Mining Methods for Anomaly Detection."
Channavajjala, Srirama T., U.S. Appl. No. 12/134,634 Office Action May 24, 2011.
Channavajjala, Srirama T., U.S. Appl. No. 12/134,634 Office Action Sep. 27, 2010.
Holmes, Michael B., U.S. Appl. No. 12/241,227 Notice of Allowance Apr. 5, 2012.
Holmes, Michael B., U.S. Appl. No. 12/241,227 Notice of Allowance Apr. 20, 2012.
Holmes, Michael B., U.S. Appl. No. 12/241,227 Office Action Oct. 13, 2011.
USPTO Notice of Allowance for U.S. Appl. No. 13/304,111, Oct. 7, 2014, 10 pages, USA.
USPTO Office Action for U.S. Appl. No. 12/134,634, May 24, 2011, 21 pages, USA.
USPTO Office Action for U.S. Appl. No. 12/134,634, Sep. 27, 2010, 15 pages, USA.
USPTO Office Action for U.S. Appl. No. 13/304,111, Aug. 6, 2013, 24 pages, USA.
USPTO Office Action for U.S. Appl. No. 13/304,111, Dec. 19, 2012, 11 pages, USA.
USPTO Office Action for U.S. Appl. No. 13/304,111, Mar. 31, 2014, 24 pages, USA.
USPTO Office Action for U.S. Appl. No. 13/304,111, Oct. 18, 2012, 18 pages, USA.

\* cited by examiner

SYSTEM AND METHOD OF PERFORMING LOCATION ANALYTICS

CROSS REFERENCE TO RELATED APPLICATIONS

The present application is a continuation of U.S. Ser. No. 13/304,111, filed on Nov. 23, 2011, entitled "System and Method of Performing Location Analytics," which is a continuation of U.S. Ser. No. 12/134,634, filed on Jun. 6, 2008, entitled "System and Method of Performing Location Analytics," the disclosure of each of which is incorporated herein by reference in its entirety.

TECHNICAL FIELD OF THE INVENTION

The present invention generally relates to systems and methods for performing sensor analytics. More specifically, the present invention relates to systems and methods for associating time/location data points.

BACKGROUND OF THE INVENTION

The proliferation of UPS and other positioning methods in mobile phones, taxis, personal navigation devices and automobiles has begun to generate an enormous amount of historic and real-time data, consisting of a latitude, longitude, unique identifier, and some metadata in many cases like if a taxi is full or empty.

For example, location-based media (LBM) delivers multimedia directly to the user of a mobile device dependent upon their location. The media can be delivered to, or triggered within any portable wireless device that is location enabled and has the capacity to display audiovisual content. Media content is managed and organized externally of the device on a standard desktop or laptop. The mobile device then downloads formatted content with location coordinated triggers applied to each media sequence. As the location-aware device enters the selected area, the assigned media is triggered. The assigned media is designed to be of optimal relevance to the user in the context of the user's surroundings.

In addition to location based media, there are other back-end server systems that process sensor data in real-time, including GPS, Wifi, and other location data, for example, a taxi dispatch system, the air traffic control system, or RFID systems for tracking supply chains. All of these systems were built for a specific purpose, a specific kind of sensor, and provide limited and focused analysis relevant to the specialized system. Moreover, historical information and related geographic information is typically limited to the current time and place of the subject of interest.

There has not been a system employing methodologies to associate data based on the historical location record of an individual device or user and demographic data that may be associated with the locations in the historical location record of an individual user.

SUMMARY OF THE INVENTION

The present invention generally relates to systems and methods for performing sensor analytics. More specifically, the present invention relates to systems and methods for associating time/location data points. In an exemplary implementation, a location source having a unique identifier can be associated with a time, a place, or a time and place. One or more demographic profiles can be associated with the time and or place. Multiple time, place and associated demographic profiles can result in the determination of a likely profile of the unique identifier. The geographic location of the unique identifier with the profile association can then be displayed in real time with other unique identifiers with the same or different profile associations.

In an implementation, the time and place of the unique identifier, such as the time a mobile telephone is at a specific geographic location, can be associated with one or more demographic profiles, for example, census bureau data. By tracking time and place of the unique identifier along with the associated one or more demographic profiles of each place at the specific time, certain inferences can be made about the unique identifier. By way of example and without limitation, a cellular telephone that is frequently in the warehouse district of city "Metropolis" during normal business hours can be associated with the transportation or logistics business sector. But a cellular telephone that is frequently in the warehouse district of city "Metropolis" during the late night and early morning hours can be associated with the late night entertainment industry.

Further associations can be made. The cellular telephone that is in the warehouse district during business hours may also be found in suburban retail locations during the early evening hours and in a middle-class suburban neighborhood during the late night and early morning hours. Based on the historical time and location data of the particular cellular telephone and the census data associated with each time and location data point, the user of the first cellular telephone can be assigned a source profile. In the present example the user of the first cellular telephone can generally be associated with groups identifying with middle-class working people leading a largely suburban lifestyle.

At the same time, further association can also be made about the second cellular telephone that is in the warehouse district during the late night and early morning hours. Continuing with the example, the second cellular telephone may also be found in and around a university campus during business hours and frequently located in a lower rent neighborhood having a high percentage of students during overnight hours. From the demographic data associated with the historical record of the second cellular telephone's time and location data, the user of the second telephone can generally be associated with groups identifying with socially active college or graduate students.

In both the case of the first cellular telephone and the second cellular telephone meaningful information in the form of a user or source profile was determined by linking or associating various demographic or other information with the times and places that the various location sources, and by extension the user, traveled. The user or source profile was determined without the benefit of a prior registered profile of the user, or without soliciting profiling information such as user or consumer preferences. And the user or source profile was determined without the user choosing which demographic, consumer or user groups he or she would prefer to be associated with. As such, the groups or "tribes" that the user is likely to identify with are an accurate reflection of the user's habits or actual behavior.

In another implementation a computer implemented method is provided for conveying aggregate location based information comprising: receiving one or more individualized data points; associating one or more demographics profiles with the individualized data point; aggregating the individualized data point and associated demographic with a second location data point having a second associated demographic profile; and exporting the aggregate location data.

In other implementations the received individualized data is associated with an individual user, an individual location enabled device, a mobile device, or anonymously associated with a specific user or device. The individualized data point can be associated with at least one user and received from a data provider or data aggregator. The individualized data can be received in real time or according to a predetermined schedule. The individualized data can be received according to a source profile. The individualized data points can be associated with a historical file.

In yet another implementation associating the source profile with the individualized data point maintains the anonymity of the user. The individualized data point can be associated with a demographic profile wherein the demographic profile comprises historical location data points. The demographic profile can comprise information from the group comprising: Census Bureau data, financial demographics, social demographics, tribe/group demographics, historical demographical information; derived demographic information; gender; race; educational level; historical geographic information; or user entered information/preferences. A demographic profile can be disassociated from an individualized data point or a profile. A demographic profile can be selectively disassociated from an individualized data point or profile. Historical demographics can be disassociated from an individualized data point or profile. Historical demographics can be selectively disassociated from an individualized data point or profile.

In still a further implementation, an individualized data point and associated demographic can be associated with a second individualized data point and second associated demographic, wherein the individualized data point and second data point are related to the same user or to different users.

In another implementation, multiple individualized data points can be aggregated to derive one or more tribes relating to the individualized data points or associated demographics. Having determined a tribal affiliation of the individualized data points, a further implementation can recommend items of interest associated with a tribe. Items of interest can be recommended based on a historical record of an individualized data point. The individualized data point can be identified with all tribes of interest to the individualized data point. Tribal activity can be indexed based on tribal historical location data.

In a further implementation a plurality of individualized data points associated and aggregated with a tribe are exported to a display on a user interface. The display can include a map of an area of interest. The display can be in real time. Tribes can be selectively displayed on a map of an area of interest. Items of interest associated with a tribe can be displayed on a map of an area of interest. Items of interest associated with a tribe can be listed in a textual document or in a list view.

In another implementation a computer readable medium is provided wherein the computer readable medium has stored thereon a computer program that, when executed, causes a computer to perform the steps of: receiving one or more individualized data points; associating one or more demographics profiles with the individualized data point; aggregating the individualized data point and associated demographic with a second location data point having a second associated demographic profile; and exporting the aggregated individualized data point and second location data point.

In yet another implementation a system for determining and conveying aggregate location based information is provided, the system comprising: a network; one or more location enabled user devices in communication with the network, wherein the one or more location enabled user devices have an individualized location data point; and a processor in communication with the network, wherein the processor receives one or more individualized location data points from the one or more location enabled user devices, the processor associates the one or more individualized location data points with one or more demographic profiles and aggregates the individualized location data point having the associated demographic profile with a second location data point having a second associated demographic profile, and exports the aggregated individualized location data point and the second location data point to the network.

DETAILED DESCRIPTION

For the purposes herein, a "tribe" is any association of a unique identifier with other unique identifiers that share a common demographic profile or other common association. Tribes can include individuals that are in a particular place at a particular time or individuals that frequent a particular place during a particular occurrence. For example, and without limitation, a tribe can include:
  i. all individuals that visit a shopping mall on Saturday afternoon, or
  ii. all individuals that visit a shopping mall during a sale or discount event.

A tribe can include an association of individuals, devices or other unique identifiers by age, gender, race, religion, national or regional origin, organizational membership or participation, educational level, income level, tax bracket, profession, vocation, occupation, consumer demographical information, political leaning, hobby, interest, activity, geographic location, neighborhood, town, borough, city, county, state, preferred consumer/retail/wholesale provider, event, occurrence, participation in an event or occurrence, time or time period, or any other shared experience in type, time or location between two or more unique identifiers.

For the purposes herein, a "unique identifier" is any information that identifies a particular person, device, object, event or place at a particular time, occurrence or location. A unique identifier can be a location enabled device, such as a cellular telephone, a GPS enabled device, a networked device, a WiFi enabled device, an RFID enabled device, an ATM machine, or any other device that identifies a time/location data point. A unique identifier can also include a place or event that identifies a time/location data point associated with that place or event.

For the purposes herein, a "time/location data point" is data or other information that identifies a specific event, user, or device at a specific time and/or location. For example, and without limitation, a time/location data point can include:
  i. a time stamp associated with a geographic location, such as, the time at a latitude and longitude;
  ii. a time stamp associated with a specific event at a fixed geographic location, such as, the time of a special or sale at a store or entertainment venue; or
  iii. the occurrence of an event at a particular time and location, such as, a full taxi cab in the warehouse district at 2:00 am.

For the purposes herein, an "individualized location data point" is a unique identifier having a time/location data point. An individualized location data point can be associated with one or more tribes.

In an implementation, one or more individualized data points associated with one or more tribes are displayed on a map. The display is in real time. The display is delayed from real time by a time differential. The display is refreshed according to a predetermined schedule.

In an implementation the relative population density of individualized data points comprising a tribe in any given location is displayed. In an implementation, places and events of interest are displayed that are of interest to the tribes displayed. In an implementation, targeted information is displayed with the geographic location and population density of a tribe.

In an implementation tribe membership of an individualized data point is determined based on historical location and time data. In an implementation tribe membership is determined based on demographic information associated with the time/location data point associated with the individualized data point. In an implementation demographic profiles of one or more individualized data points are derived from tribe membership, time/location data points, demographic information associated with time/location data points, historical data associated and unassociated with a time/location data point, or historical data associated and unassociated with an individualized data point.

For the purposes herein, "demographic information" and "demographic profile" means any information, historical or derived, which describes or categorizes a particular place, location, event, occurrence, time or period of time, individual, user, device or object, unique identifier, and the like. Demographic information and demographic profile can include, without limitation: Census Bureau data, age, gender, religion, ethnicity, national or regional origin, education level, income level, employment, occupation, vocation, career, hobby, interest, marital status, sexual orientation, consumer preferences, consumer habits, organizational membership and participation, occurrence of an event, geographic location, time or time period, tribe membership and/or tribe association.

Figure 1:
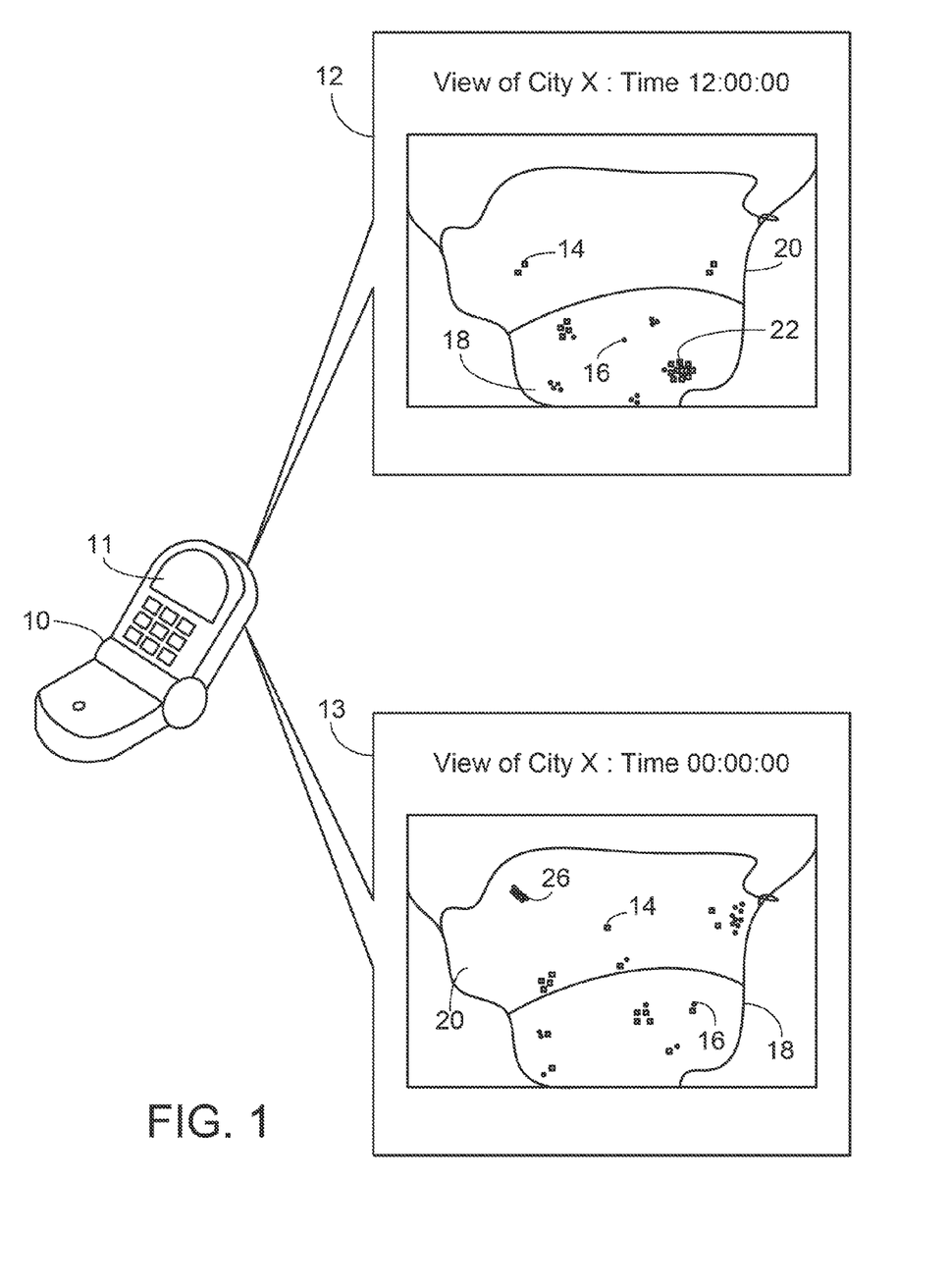
FIG. 1 shows a series of screen shots depicting the location of associated data in accordance with an implementation of the present invention.

In an exemplary implementation depicted in FIG. 1, mobile device 10 includes a user interface having a display 11 on which one or more tribes can be displayed at various geographic locations, such as locations on a city map, at a particular point in time. In view 12 tribes 14 and 16 are displayed at various locations around City X, including neighborhood 18 and neighborhood 20, at time 12:00:00. In view 13 tribes 14 and 16 are displayed at various locations around City X, including neighborhood 18 and neighborhood 20 at time 00:00:00. Tribes can be identified on the display 11 by tribe indicators 14 and 16. Tribe indicators 14 and 16 can be of any unique icon, shape or color that distinguishes one tribe from another.

In the exemplary implementation of FIG. 1, it is apparent that tribe 14 clusters around location 22 in neighborhood 18 at time 12:00:00. Tribe 14 is also fairly dispersed between neighborhoods 18 and 20 at time 00:00:00. Also, tribe 16 is fairly dispersed between neighborhoods 18 and 20 at time 12:00:00 and concentrated at location 26 in neighborhood 20 at time 00:00:00.

As described further below, knowing demographic information about neighborhoods 18 and 20, as well as locations 22 and 26 can provide meaningful information leading to a user profile for members of tribes 14 and 16.

Figure 2:
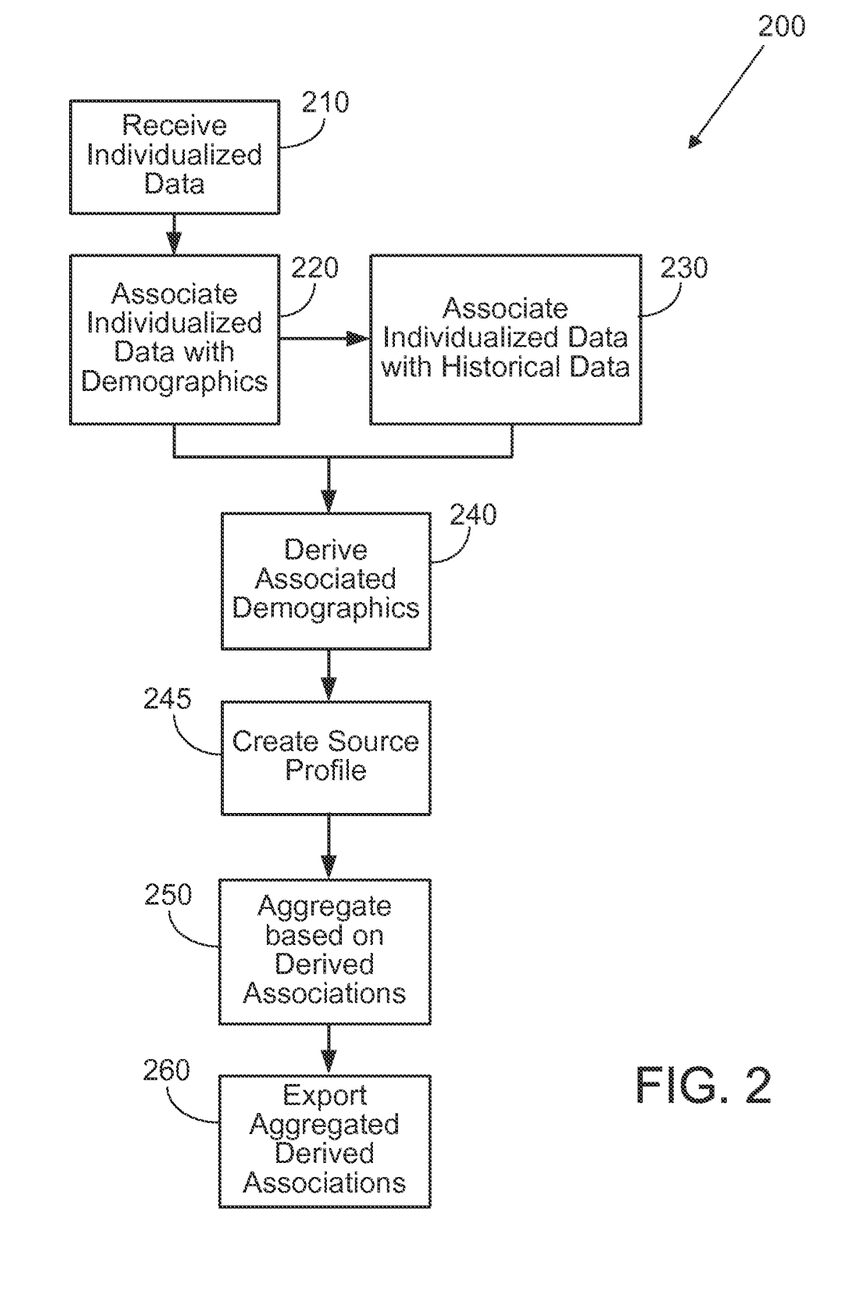
FIG. 2 shows a flow chart of an implementation of the present invention.

FIG. 2 depicts an exemplary method 200 for associating information with a time/location data point to determine, for example tribe membership, including receiving individualized time/location data points 210; associating the individualized time/location data points with demographic information 220 and associating the individualized time/location data point with a historical record the unique identifier associated with the individualized time/location data point 230; deriving source profiles, demographic profiles and/or demographic information associated with the individualized time/location data point 240; aggregating two or more individualized time/location data points having associated source or demographic profiles 250; and displaying the aggregated individualized time/location data points 260.

In step 210, individualized time/location data is received, for example, at a location based service provider facility. As discussed above, an individualized time/location data point is data or other information that identifies a specific event, user, or device at a specific time and/or location. This can include GPS data from a specific GPS enabled device, such as a GPS enabled cellular telephone, navigational device, laptop computer, and the like. This can also include the location of a cellular telephone within the cellular network, i.e., the location of the particular cellular telephone within a particular cell at a particular time. This can also include passive location based services such as ATM machines, which give the time and location of a unique user. This can also include RFID enabled devices such as RFID toll collection services similar to the EZPass system. This can also include the location of a computer within a WiFi network. The examples provided where in are exemplary and not intended to be limiting. The individualized time/location data point is unique to the source of the data, for example, unique to the cellular telephone, ATM debit card, or EZPass RFID transmitter.

Once the location and time of a unique source are received and identified, demographic information can be associated with the time, place or time and place for which the unique source is located. As such, demographic information and profiles are associated at step 220 with the individualized time/location data point. The demographic information can identify, for example, the average income, age, and educational level of residents living in the neighborhood for which the unique identifier is located, as indicated by the individualized time/location data point. The demographic information can include, for example, the consumer trends and profiles associated with individuals who have previously been at the location during the time that the unique identifier also located, as indicated by the individualized time/location data point. As previously discussed, the demographic information that can be associated with the time and/or location can include a variety of information including: Census Bureau data, age, gender, religion, ethnicity, national or regional origin, education level, income level, employment, occupation, vocation, career, hobby, interest, marital status, sexual orientation, consumer preferences, consumer habits, organizational membership and participation, occurrence of an event, geographic location, time or time period, tribe membership and/or tribe association.

A historical record of the previous locations to which the unique identifier has traveled can also be analyzed and associated at step 230 with the individualized time/location data point. For example, based on previous locations that the unique identifier has traveled, various tribes may already be attributed to the unique identifier. Additionally, various demographic profiles associated with the previous locations of the unique identifier may also be known. By way of example, a unique identifier that spends four hours every afternoon in an exclusive shopping district can be associated with a number of demographics and/or tribes. But knowing that the same unique identifier spent the previous four hours at a community college in a largely immigrant community adds additional information leading to a smaller set of likely tribal associations.

After associating at step 220 demographic information relating to the current individualized time/location data point and associating at step 230 historical information about the unique identifier of the individualized data point, inferences, profiles, and further informational association can be derived. Derivation at step 240 of the associated demographic profiles can include comparing the individualized time/location data point and previous or historical tribal associations with demographic information related to the location and time of the current position of the unique identifier. Derivation at step 240 allows for further refinement of tribal associations and assignment of new tribal associations. Derived analytics can be obtained. Such analytics include, without limitation, a relative degree of association of the unique identifier with a tribe and or recommendations of places, topics, events or items of interest to a particular tribe.

Derivation at step 240 allows for linking and storing at step 245 of demographic information with the unique identifier for future use in historical association at step 230 as more individualized time/location data points become available. The stored demographic information can be exported to other applications for further analysis.

Once tribal associations of a unique identifier are derived, a plurality of individualized time/location data points having tribal associations are aggregated at step 250 to determine the location of members of any particular tribe. Analytics can be performed on the aggregated data, including:

i. population density of tribes within a given geographic location, such as the number of middle income individuals over 30 at a shopping mall;

ii. the number of tribal members within one or more designated areas at a designated time or time period, such as the number of women under 25 at specific retail locations during a sales event; and iii. the occurrence of an event for a tribal member in a specific location at a specific time, such as the number of a taxi cabs carrying passengers in the late afternoon in the financial district of a city.

Having aggregated a plurality of individualized time/location data points with associated demographics and derived tribal associations, information about individuals and tribes can be recorded for further processing or displayed at step 260 to a user. Display of the aggregated derived tribal information can be, for example, to a mobile device, a user terminal such as a personal computer, a networked system display such as an ATM, or a public display.

Figure 3:
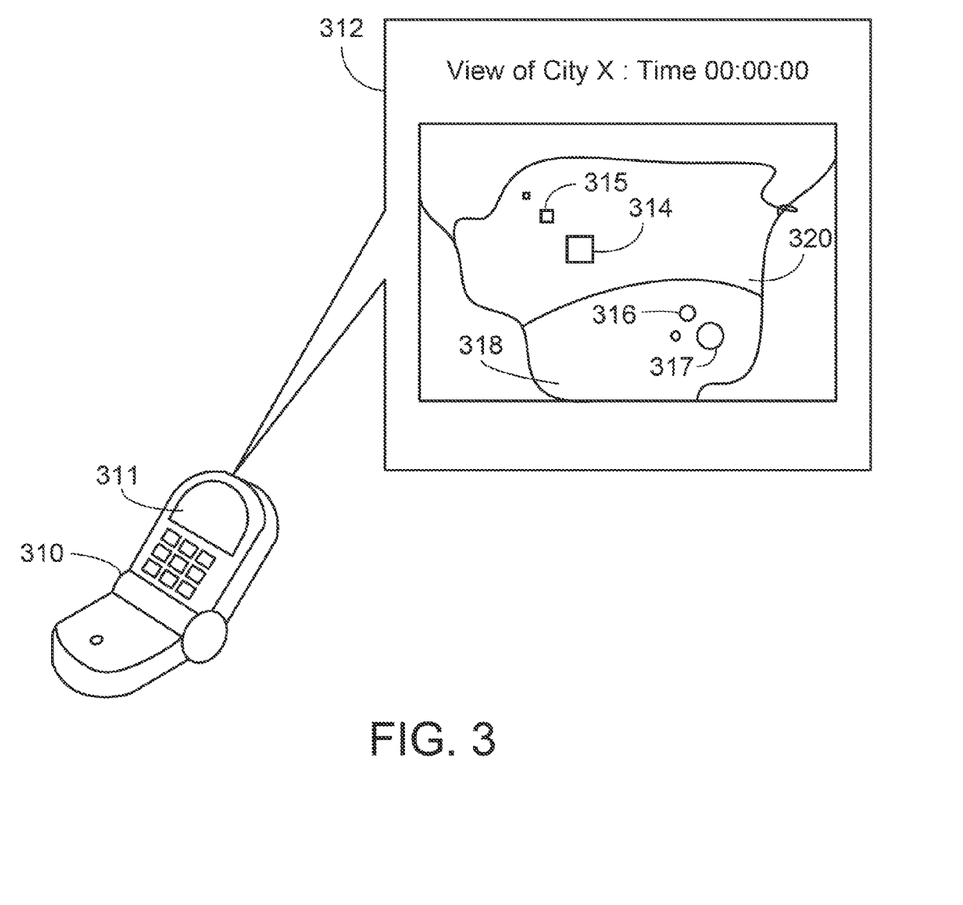
FIG. 3 shows a screen shot depicting associated data in accordance with an implementation of the present invention.

In an exemplary implementation as shown in FIG. 3, the mobile device 310 includes display 311 having display view 312 showing the location of tribes 314 and 316 at various locations in City X including neighborhood 318 and 320. Relying on analytics performed on the aggregated individualize time/location data points, as described above, population density for a particular tribe is shown by varying the size of the tribal icon 314. For example, tribal icon 315 is similar to but smaller than tribal icon 314, thereby indicating fewer tribal members at the location indicated by tribal icon 315. Likewise, tribal icon 317 is similar to but larger than tribal icon 316, thereby indicating more tribal members at the location indicated by tribal icon 317. The relative population density of a tribe can be indicated by any manner of display means including variations in icon size, shape, color, intensity, and the like. Similarly, information relating to tribes, tribe location, tribal population density and the like can be conveyed to the user in graphical or textual format, for example, as icons on a map view or as a list view in a textual document.

Figure 4:
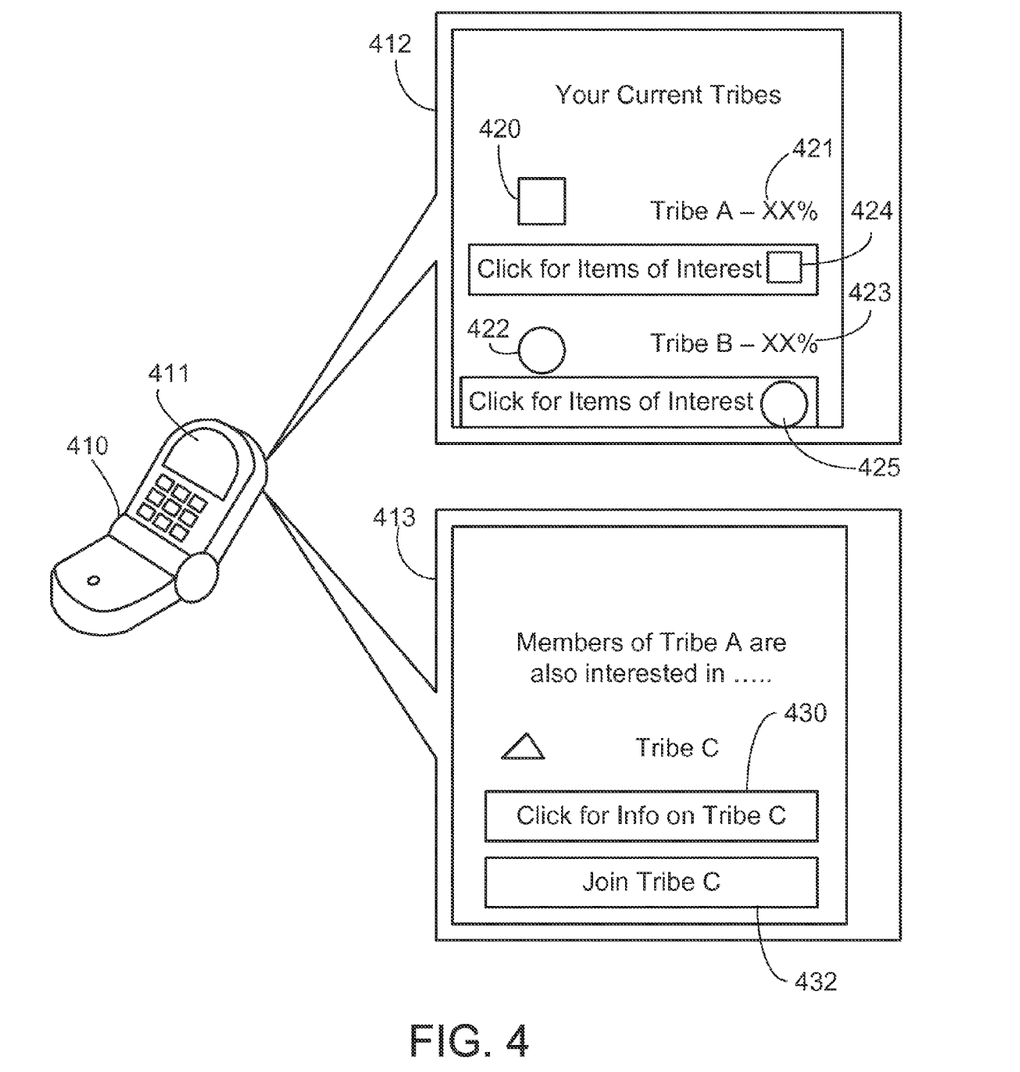
FIG. 4 shows a screen shot for managing associated data in accordance with the present invention.

In an exemplary implementation as shown in FIG. 4, a user interface is provided on a mobile device 410 having a display 411. View 412 of display 411 shows a user tribal associations to which the user belongs. As described above, tribal associations are determined by associating the unique identifier of the particular mobile device of the user with a particular place at a particular time to obtain an individualized time/location data point. Demographic and historical information are associated with the individualized data point and the unique identifier to derive certain tribal associations. View 412 displays to the user two tribal associations 420 and 422 along with certain derived information, such as, for example, the percentage of association of the user with Tribe A indicated by percentage display 421 and 423. The user can access additional derived information through user prompt 424 and 425, such as, for example, obtaining information about items of interest to a particular tribe. View 413 depicts additional derived information available to the user, such as for example, recommended items of interest for a particular tribe. The recommended items of interest can include retail locations, services, organizations, places of interest, people of interest, tribes of interest, events and the like. By way of example, view 413 shows that members of Tribe A are also interested in Tribe C. The user can be prompted to obtain more information about the recommended item of interest, as in prompt 430 or to participate in the item of interest, as in prompt 432.

Figure 5:
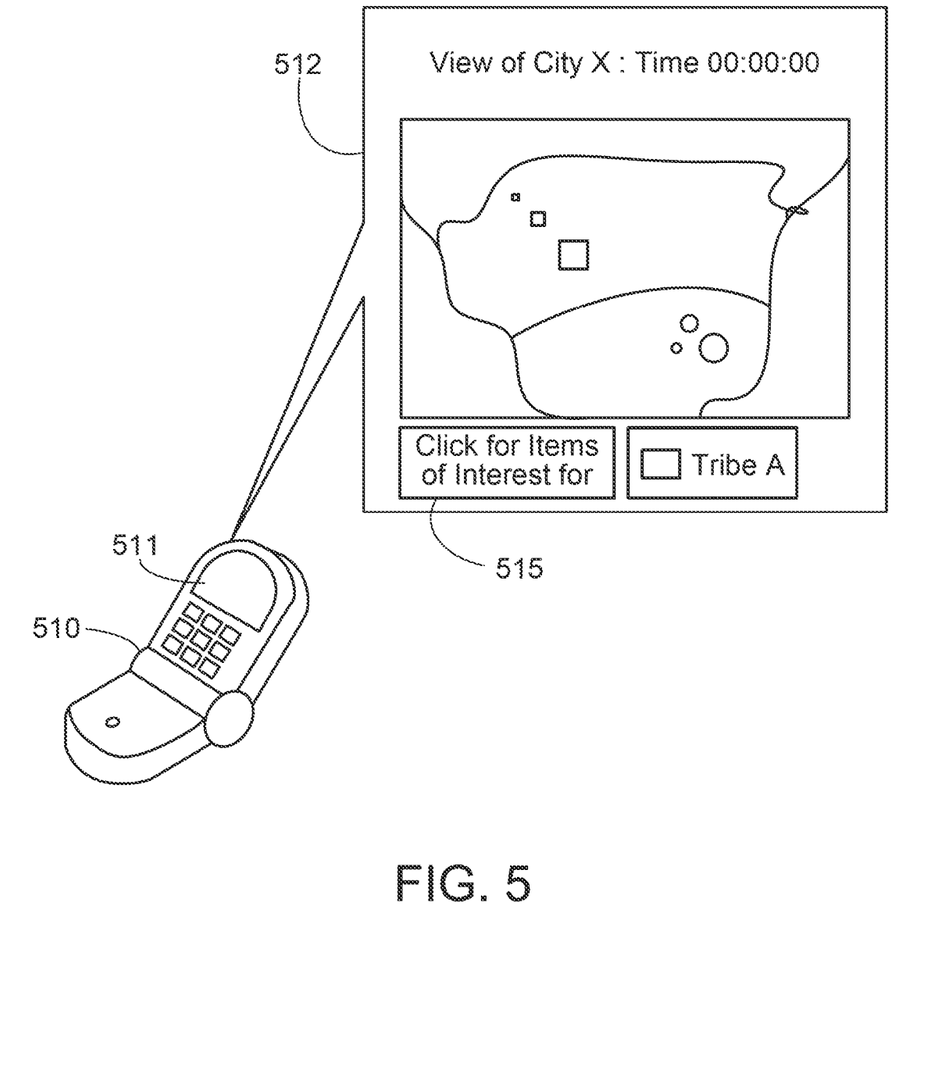
FIG. 5 shows a screen shot for managing associated data in accordance with the present invention.
Figure 6:
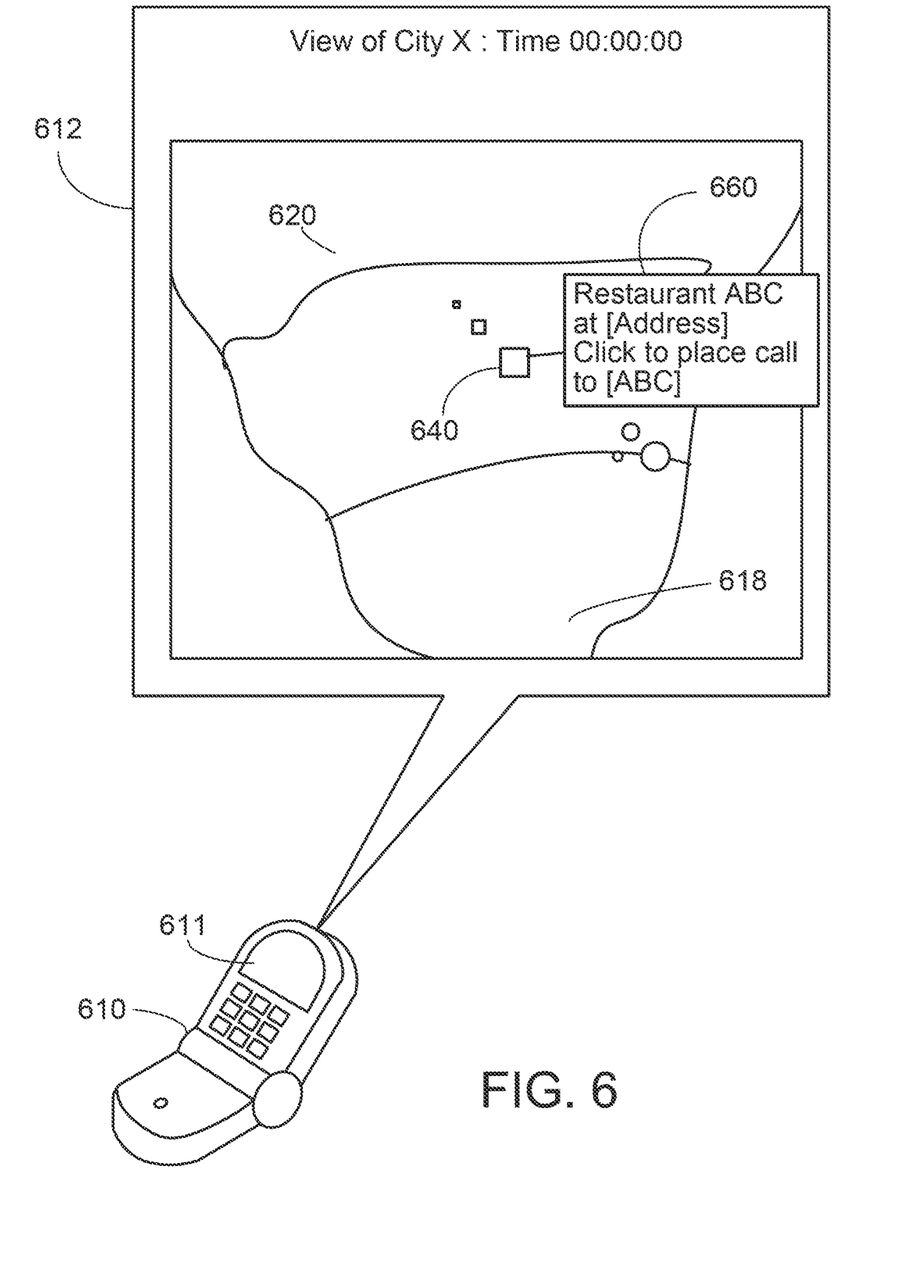
FIG. 6 shows a screen shot depicting associated data in accordance with the present invention.

FIG. 5 depicts another exemplary implementation of a user interface for gaining access to derived information associated with a tribe. For example, the user can be prompted to obtain items of interest to tribe A through user prompt 515. FIG. 6 depicts an exemplary implementation of view 612 of mobile device 610 having display 611. View 612 of display 611 shows neighborhoods 618 and 620, and an item of interest at a location 640 having a relatively high population density of members of tribe A. Call out 660 can be an interactive window or other user prompt allowing connectivity via the internet telephone line, email, text message or other media to the item of interest at the location 640.

Figure 7:
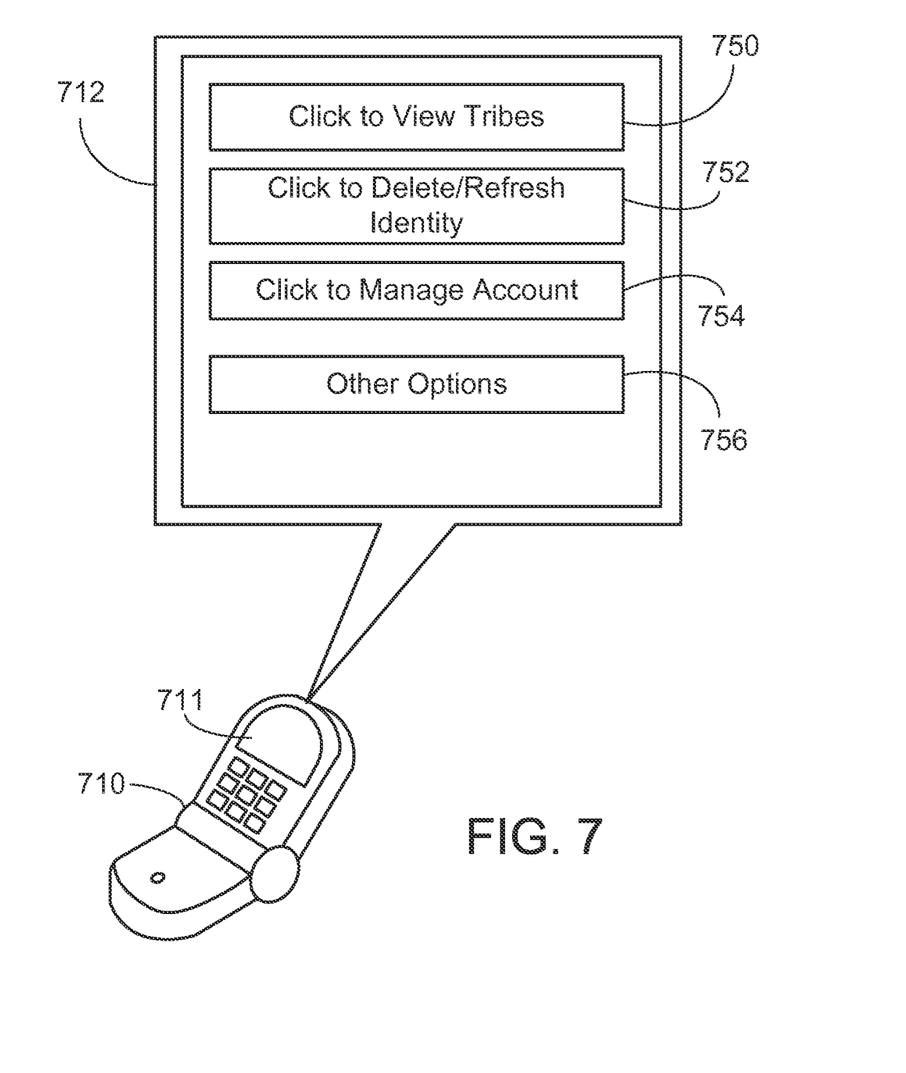
FIG. 7 shows a screen shot for managing associated data in accordance with the present invention.

FIG. 7 depicts an exemplary user interface for managing a user profile associated with a unique identifier and associated demographic and historical information, and features mobile device 710 having display 711. View 712 of display 711 shows user prompts 750 for view tribes to which the user may be assigned, user prompt 752 for refreshing or deleting the source profile, account management prompt 754 and other miscellaneous prompts 756.

Figure 8:
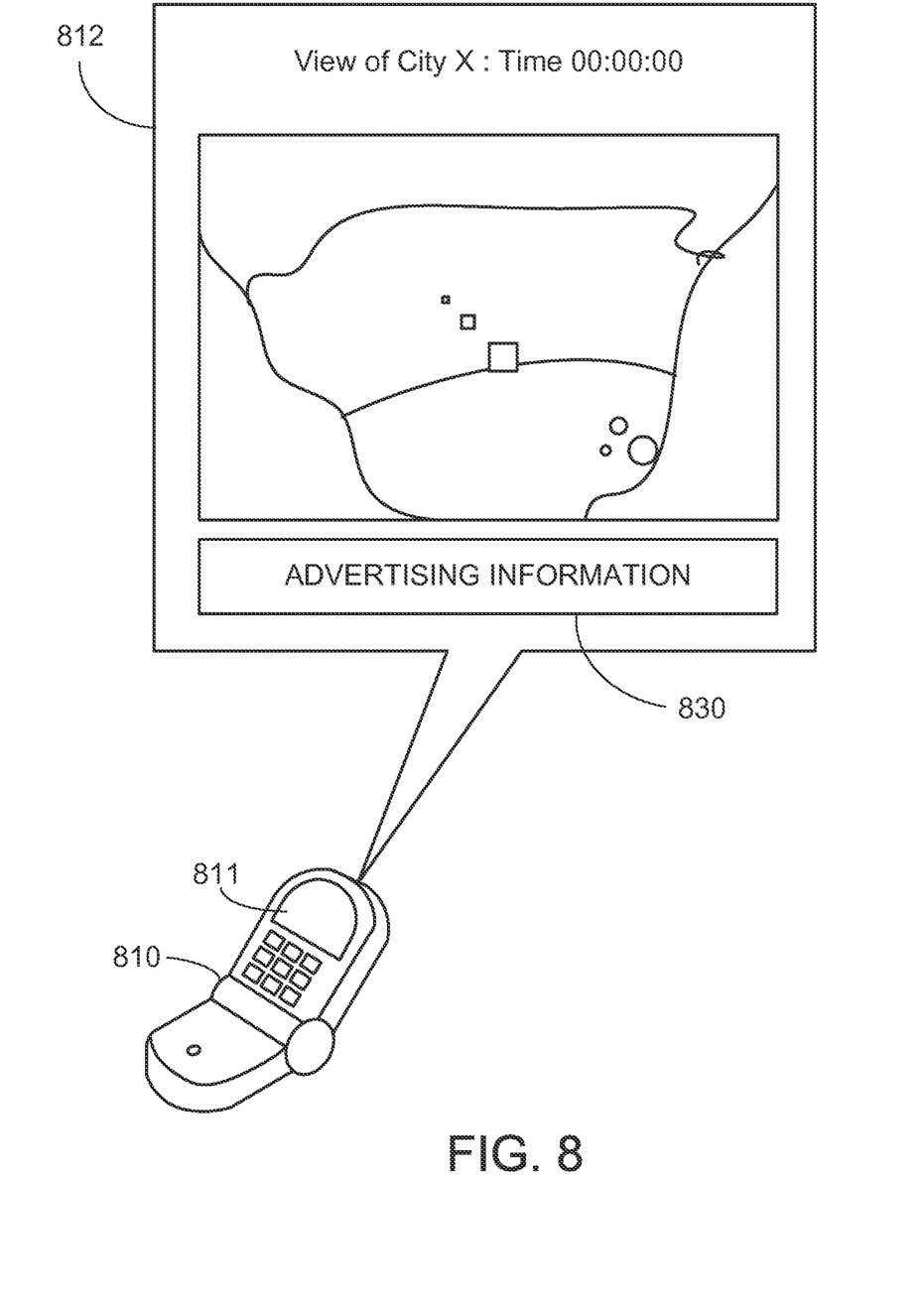
FIG. 8 shows a screen shot depicting associated data in accordance with the present invention.

FIG. 8 depicts an exemplary user display 811 of mobile device 810. Display 811 includes view 812 showing advertising information 830 displayed in a window or banner. Advertising information 830 can include any information likely to be of interest to a tribe to which the user belongs or targeted to the user based on tribal affiliation, information in the source profile including associated demographic and historical information, geographic location of the unique identifier, and the like.

Although interactive windows have been shown to indicate user interface options, other means of data selection and input are available including touch screen, keyboard, voice recognition, or physical manipulation of the device. In an exemplary implementation, the location of tribal members can be displayed on the user display of a mobile device at any time by deliberately shaking the device in a repeated manner. An accelerometer embedded within the mobile device sense the shaking of the device and instructs the device to display the current location of the tribal members.

In other implementations, functionality of the user device, such as a mobile telephone can be linked to derived information available to the user. For example, the alarm function of the mobile telephone can be triggered should the population density of a tribe at a particular location reach a predetermined number. An example can include an alarm trigger if the number of vehicles passing over a bridge or toll booth exceed X number per minute.

Figure 9:
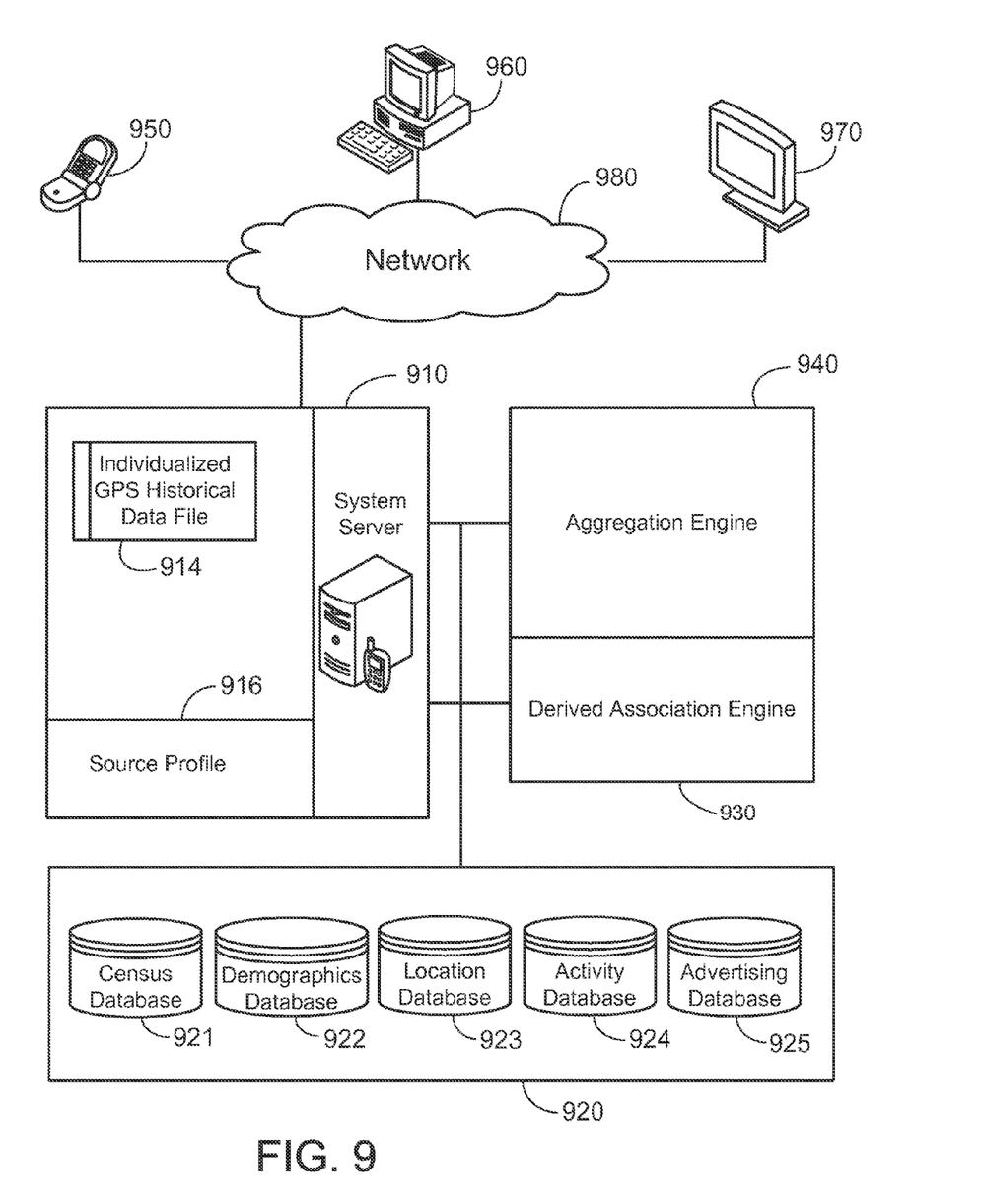
FIG. 9 shows a system diagram of an implementation of the present invention.

FIG. 9 depicts a system diagram of an exemplary implementation. System 900 includes system server 910. System server 910 can include a processor coupled to a computer readable memory. System server is in communication with individualized time/location data point historical file 914 and source profile 916. Historical file 914 and source profile 916 can be stored on system server 910 or on a secondary storage device (not shown). System server 910 is also in communication with database bank 920. Database bank 920 can include one or more databases or access to databases including Census Database 921, Demographic information database 922, Location database 923, activity database 924, and advertising database 925. Other databases can be used. System server 910 and database bank 920 are in communication with derived association engine 930 and aggregation engine 940. System server 910 is also in communication with user device 950, user terminal 960 and public display 970 via network 980. Network 980 can be the Internet.

In operation, System server 910 receives an individualized time/location data point from either user device 950 or user terminal 960. The system server 910 is configured to associate the individualized time/location data point with a source profile 916 and a historical file 914. Derived association engine 940 is configured to match demographic information retrieved from database bank 920 with the individualized time/location data point and associated historical information and assign one or more tribes to the individualized data point. The tribal association is recorded and the historical data file 914 and source file 916 are updated.

Aggregation engine 940 is configured to compile individualized time/location data points with their associated tribal designations. Aggregation engine 940 is further configured to determine additional derived data relating to the number and frequency of various individualized data points and/or tribal members within a given place, location or time period. Aggregation engine 940 provides the aggregated location of all individualized data points within a tribe along with the additional derived data to system server 910. System server 910 then exports the aggregated and derived data to user device 950, user terminal 960 and public display 910. The aggregate data can be exported in a data feed for further processing, or displayed on a user display or public display in graphical or tabulated form.

The foregoing description is intended to illustrate various aspects of the present invention. It is not intended that the examples presented herein limit the scope of the present invention. The invention now being fully described, it will be apparent to one of ordinary skill in the art that many changes and modifications can be made thereto without departing from the spirit or scope of the appended claims.

What is claimed:

1. A method comprising:
processing a first transmission received by a processor of a server system, the first transmission identifying a first location, detected by a global positioning system (GPS) device, of a location enabled device in a geographic area, wherein the location enabled device is identified by a unique identifier;
storing, via the processor of the server system, a historical record for the unique identifier in a data store of the server system, the historical record comprising location data based at least in part on detected past locations and times of locations the location enabled device has previously been, the past locations associated with the unique identifier;
associating, via the processor of the server system, individualized location data with the historical record for the unique identifier stored in the data store so that the location data is based at least in part on the individualized location data, the individualized location data corresponding to the first location of the location enabled device;
matching, via the processor of the server system, demographic information corresponding, in part, to the geographic area, the demographic information associated with a demographic profile retrieved from the data store with at least a portion of the location data of the historical record, and based at least in part on the matching, identifying a tribe of a plurality of users to associate with the unique identifier, the users sharing at least one common attribute, and storing an assignment in the data store of the unique identifier to the tribe;
processing, via the processor of the server system, a second transmission received by the server system, the second transmission identifying a second location, detected by the GPS device, of the location enabled device;
accessing, via the processor of the server system, a record retained by the server system for one or more other unique identifiers assigned to the tribe;
performing, via the processor of the server system, analytics that include deriving a recommendation of one or more items of interest based at least in part on the record for the one or more other unique identifiers assigned to the tribe and based at least in part on second location data corresponding to the second location of the location enabled device, the recommendation comprises indicia denoting the items of interest of the users of the tribe being recommended to a user of a user device; and transmitting, via the processor of the server system, a third transmission indicating the recommendation to the user device of the user, associated with the one or more other unique identifiers of the tribe.

2. The method of claim 1, wherein the matching the demographic information associated with the demographic profile is based at least in part on inferring that the demographic information for the geographic area including the first location applies to the unique identifier.

3. The method of claim 1, wherein the user device comprises a computer, a cellular telephone, an automated teller-machine, a radio-frequency enabled device, a global positioning system enabled device, and/or a navigational device.

4. The method of claim 1, wherein the user device comprises a data source.

5. The method of claim 1, wherein the user device is different from the location enabled device.

6. The method of claim 1, wherein:
the historical record further comprises time data comprising indicia specifying the times of the locations, based at least in part on the past locations associated with the unique identifier;
the associating individualized location data with the historical record for the unique identifier comprises associating individualized time data so that the time data is based at least in part on the individualized time data, the individualized time data corresponding to the first location of the location enabled device;
the matching by the server system the demographic information associated with the demographic profile comprises matching the demographic information with at least a portion of the time data of the historical record; and
the deriving the recommendation is based at least in part on second time data corresponding to the second location of the location enabled device.

7. The method of claim 1, wherein the recommendation of the items of interest indicates one or more of a retail location, a service, an organization, an event, a person, and/or another tribe.

8. The method of claim 1, further comprising:
providing visible indicia denoting the items of interest of the users of the tribe on a map indicating a determined geographic area of interest presented to a user interface of a display device of the user device.

9. A system comprising:
a server system comprising one or more servers communicatively coupled to a network interface to facilitate access to a network, the server system comprising a data store communicatively coupled to the one or more servers, the one or more servers to:
process a first transmission received by a server system, the first transmission identifying a first location, detected by a global positioning system (GPS) device, of a location enabled device in a geographic area, wherein the location enabled device is identified by a unique identifier;
store a historical record for the unique identifier in the data store, the historical record comprising location data based at least in part on detected past locations and times of locations the location enabled device has previously been, the past locations associated with the unique identifier;
associate individualized location data with the historical record for the unique identifier stored in the data store so that the location data is based at least in part on the individualized location data, the individualized location data corresponding to the first location of the location enabled device;
match demographic information corresponding, in part, to the geographic area, the demographic information associated with a demographic profile retrieved from the data store with at least a portion of the location data of the historical record, and based at least in part on the matching, identify a tribe of a plurality of users to associate with the unique identifier, the users sharing at least one common attribute, and storing an assignment in the data store of the unique identifier to the tribe;
process a second transmission received by the server system, the second transmission identifying a second location, detected by the GPS device, of the location enabled device;
access a record retained by the server system for one or more other unique identifiers assigned to the tribe;
perform analytics that include deriving a recommendation of one or more items of interest based at least in part on the record for the one or more other unique identifiers assigned to the tribe and based at least in part on second location data corresponding to the second location of the location enabled device, the recommendation comprises indicia denoting the items of interest of the users of the tribe being recommended to a user of a user device; and
transmit a third transmission indicating the recommendation to the user device of the user, associated with the one or more other unique identifiers of the tribe.

10. The system of claim 9, wherein the matching the demographic information associated with the demographic profile is based at least in part on inferring that the demographic information for the geographic area including the first location applies to the unique identifier.

11. The system of claim 9, wherein the user device comprises a computer, a cellular telephone, an automated teller-machine, a radio-frequency enabled device, a global positioning system enabled device, and/or a navigational device.

12. The system of claim 9, wherein the user device comprises a data source.

13. The system of claim 9, wherein the user device is different from the location enabled device.

14. The system of claim 9, wherein:
the historical record further comprises time data comprising indicia specifying the times of the locations, based at least in part on the past locations associated with the unique identifier;
the associating individualized location data with the historical record for the unique identifier comprises associating individualized time data so that the time data is based at least in part on the individualized time data, the individualized time data corresponding to the first location of the location enabled device;
the matching by the server system the demographic information associated with the demographic profile comprises matching the demographic information with at least a portion of the time data of the historical record; and
the deriving the recommendation is based at least in part on second time data corresponding to the second location of the location enabled device.

15. The system of claim 9, the recommendation of the items of interest indicates one or more of a retail location, a service, an organization, an event, a person, and/or another tribe.

16. The system of claim 9, wherein the one or more servers are further configured to:
provide visible indicia denoting the items of interest of the users of the tribe on a map indicating a determined geographic area of interest presented to a user interface of a display device of the user device.

17. One or more non-transitory, processor-readable media having processor-readable instructions thereon which, when executed by one or more computers or other processing devices of a server system, cause the server system to:
process a first transmission received by a server system, the first transmission identifying a first location, detected by a global positioning system (GPS) device, of a location enabled device in a geographic area, wherein the location enabled device is identified by a unique identifier;
store a historical record for the unique identifier in the data store, the historical record comprising location data based at least in part on detected past locations and times of locations the location enabled device has previously been, the past locations associated with the unique identifier;
associate individualized location data with the historical record for the unique identifier stored in the data store so that the location data is based at least in part on the individualized location data, the individualized location data corresponding to the first location of the location enabled device;
match demographic information corresponding, in part, to the geographic area, the demographic information associated with a demographic profile retrieved from the data store with at least a portion of the location data of the historical record, and based at least in part on the matching, identify a tribe of a plurality of users to associate with the unique identifier, the users sharing at least one common attribute, and storing an assignment in the data store of the unique identifier to the tribe;
process a second transmission received by the server system, the second transmission identifying a second location, detected by the GPS device, of the location enabled device;
access a record retained by the server system for one or more other unique identifiers assigned to the tribe;
perform analytics that include deriving a recommendation of one or more items of interest based at least in part on the record for the one or more other unique identifiers assigned to the tribe and based at least in part on second location data corresponding to the second location of the location enabled device, the recommendation comprises indicia denoting the items of interest of the users of the tribe being recommended to a user of a user device; and
transmit a third transmission indicating the recommendation to the user device of the user associated with the one or more other unique identifiers of the tribe.

18. The one or more non-transitory, processor-readable media of claim 17, wherein the matching the demographic information associated with the demographic profile is based at least in part on inferring that the demographic information for the geographic area including the first location applies to the unique identifier.

19. The one or more non-transitory, processor-readable media of claim 17, wherein the user device comprises a computer, a cellular telephone, an automated teller-machine, a radio-frequency enabled device, a global positioning system enabled device, and/or a navigational device.

20. The one or more non-transitory, processor-readable media of claim 17, wherein the user device comprises a data source.

21. The one or more non-transitory, processor-readable media of claim 17, wherein the user device is different from the location enabled device.

22. The one or more non-transitory, processor-readable media of claim 17, wherein:
the historical record further comprises time data comprising indicia specifying the times of the locations, based at least in part on the past locations associated with the unique identifier;
the associating individualized location data with the historical record for the unique identifier comprises associating individualized time data so that the time data is based at least in part on the individualized time data, the individualized time data corresponding to the first location of the location enabled device;
the matching by the server system the demographic information associated with the demographic profile comprises matching the demographic information with at least a portion of the time data of the historical record; and
the deriving the recommendation is based at least in part on second time data corresponding to the second location of the location enabled device.

23. The one or more non-transitory, processor-readable media of claim 17, wherein the processor-readable instructions are further executed by the computer or other processing devices of the server system which further causes the server system to:
provide visible indicia denoting the items of interest of the users of the tribe on a map indicating a determined geographic area of interest presented to a user interface of a display device of the user device.

* * * * *